(12) United States Patent
Sathyanarayana et al.

(10) Patent No.: US 11,403,857 B2
(45) Date of Patent: Aug. 2, 2022

(54) SYSTEM AND METHOD FOR VEHICLE LOCALIZATION

(71) Applicant: Nauto, Inc., Palo Alto, CA (US)

(72) Inventors: Suchitra Sathyanarayana, Palo Alto, CA (US); Ravi Satzoda, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 92 days.

(21) Appl. No.: 16/683,106

(22) Filed: Nov. 13, 2019

(65) Prior Publication Data

US 2020/0160069 A1 May 21, 2020

Related U.S. Application Data

(60) Provisional application No. 62/769,501, filed on Nov. 19, 2018.

(51) Int. Cl.
| | | |
|---|---|---|
| *G06V 20/56* | (2022.01) | |
| *G06T 7/11* | (2017.01) | |
| *G06T 7/73* | (2017.01) | |
| *B60W 30/12* | (2020.01) | |

(52) U.S. Cl.
CPC .............. *G06V 20/588* (2022.01); *G06T 7/11* (2017.01); *G06T 7/73* (2017.01); *B60W 30/12* (2013.01); *B60W 2420/42* (2013.01); *G06T 2207/20081* (2013.01); *G06T 2207/30241* (2013.01); *G06T 2207/30256* (2013.01)

(58) Field of Classification Search
CPC ......... G06K 9/00798; G06T 7/11; G06T 7/73; G06T 2207/30256; G06T 2207/20081; G06T 2207/30241; B60W 2420/42; B60W 30/12
See application file for complete search history.

(56) References Cited

U.S. PATENT DOCUMENTS

2002/0031242 A1* 3/2002 Yasui ................. G06K 9/00798
382/104
2017/0293811 A1* 10/2017 Zhai ......................... G06K 9/46

OTHER PUBLICATIONS

Sena, Pasquale, et al. "Studying the influence of cognitive load on driver's performances by a Fuzzy analysis of Lane Keeping in a drive simulation." IFAC Proceedings vols. 46.21 (2013): 151-156. (Year: 2013).*

(Continued)

*Primary Examiner* — Vu Le
*Assistant Examiner* — Tracy Mangialaschi
(74) *Attorney, Agent, or Firm* — Vista IP Law Group, LLP

(57) ABSTRACT

The present embodiments relate to efficient localization of a vehicle within a lane region. An imaging device onboard the vehicle may capture an image stream depicting an environment surrounding the vehicle. An image may be inspected to identify pixel bands indicative of lane markings of a road depicted in the image. Based on the identified pixel bands, a lane region indicating a lane of a roadway can be extracted. A lane drift metric may be generated that indicates an offset of the vehicle relative to a center of the lane region. An output action may be initiated based on the offset indicated in the lane drift metric. The lane region can be translated from a first frame to a second frame providing a top-down perspective of the vehicle within the lane region using a transformation matrix to assist in efficiently deriving the lane drift metric.

38 Claims, 10 Drawing Sheets

(56) References Cited

OTHER PUBLICATIONS

Lorentzon, Mattis, and Tobias Andersson. "Road surface modeling using stereo vision." (2012). (Year: 2012).*
Yeniaydin Y, Schmidt KW. A lane detection algorithm based on reliable lane markings. In 2018 26th Signal Processing and Communications Applications Conference (SIU) May 2, 2018 (pp. 1-4). IEEE. (Year: 2018).*
Apostoloff, Nicholas, "Vision based lane tracking using multiple cues and particle filtering", Feb. 22, 2005, pp. 1-194, XP055140029.
Hillel, Aharon Bar, et al., "Recent progress in road and lane detection: a survey", Machine Vision and Applications, vol. 25, No. 3, Apr. 1, 2014, pp. 727-745, XP055113665.
Michalke, Thomas Paul, "Task-Dependent Scene Interpretation in Driver Assistance", PhD Thesis, Jan. 1, 2009, XP055406063.
Pavululuri, Sumanth, et al., "Robust Lane Localization Using Multiple Cues On the Road", 2013 IEEE Digital Signal processing and Signal Processing Education Meeting (DSP/SPE), IEEE, Aug. 11, 2013, pp. 141-146, XP032513375.
Shin, Bok-Suk, et al., "Visual lane analysis and higher-order tasks: a concise review", Machine Vision and Applications, vol. 25, No. 6, Apr. 12, 2014, pp. 1519-1547, XP055211792.
Yeniaydin, Yasin, et al., "A Lane Detection Algorithm Based on Reliable Lane Markings", 2018 26th Signal Processing and Communications Applications Conference (SIU), IEEE, May 2, 2018, pp. 1-4, XP033373660.

\* cited by examiner

SYSTEM AND METHOD FOR VEHICLE LOCALIZATION

CROSS-REFERENCE TO RELATED APPLICATION

This application claims priority to U.S. provisional patent application Ser. No. 62/769,501 filed Nov. 19, 2018, and titled "SYSTEM AND METHOD FOR VEHICLE LOCALIZATION," which is incorporated herein in its entirety by this reference thereto.

TECHNICAL FIELD

This invention relates generally to the automotive field, and more specifically, to vehicle localization in the automotive field.

BACKGROUND

Vehicles (e.g., automobiles, trucks, motorcycles) generally travel on roadways. The roadways are typically divided into multiple lanes to allow for vehicles to maintain their position in a lane and lower the chances of contacting adjacent vehicles travelling on the roadway.

However, in many cases, a vehicle may drift from a designated lane on a roadway for any of a variety of reasons. For example, a driver may become distracted while operating the vehicle, allowing the vehicle to drift from a lane into an adjacent lane. This may increase the risks involved with vehicle collisions on roadways.

One straightforward attempt to identify whether a vehicle is drifting from a lane is to equip the vehicle with one or more cameras to capture images indicative of whether the vehicle is drifting in a lane. However, conventional image processing techniques to extract the vehicle position relative to the lane lines may rely upon preliminary calibration procedures and/or other intrinsic parameters of the camera that are not universal across image sensors or vehicles (e.g., vehicles in which the image sensors are placed). This may result in lower image accuracy and incorrect lane shift determinations derived from the images. Further, these image processing techniques may be computationally-resource intensive, as it may frequently utilize the entire image to establish motion and/or position information of the vehicle in a three-dimensional environment that require complex models or algorithms.

BRIEF DESCRIPTION OF THE FIGURES

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
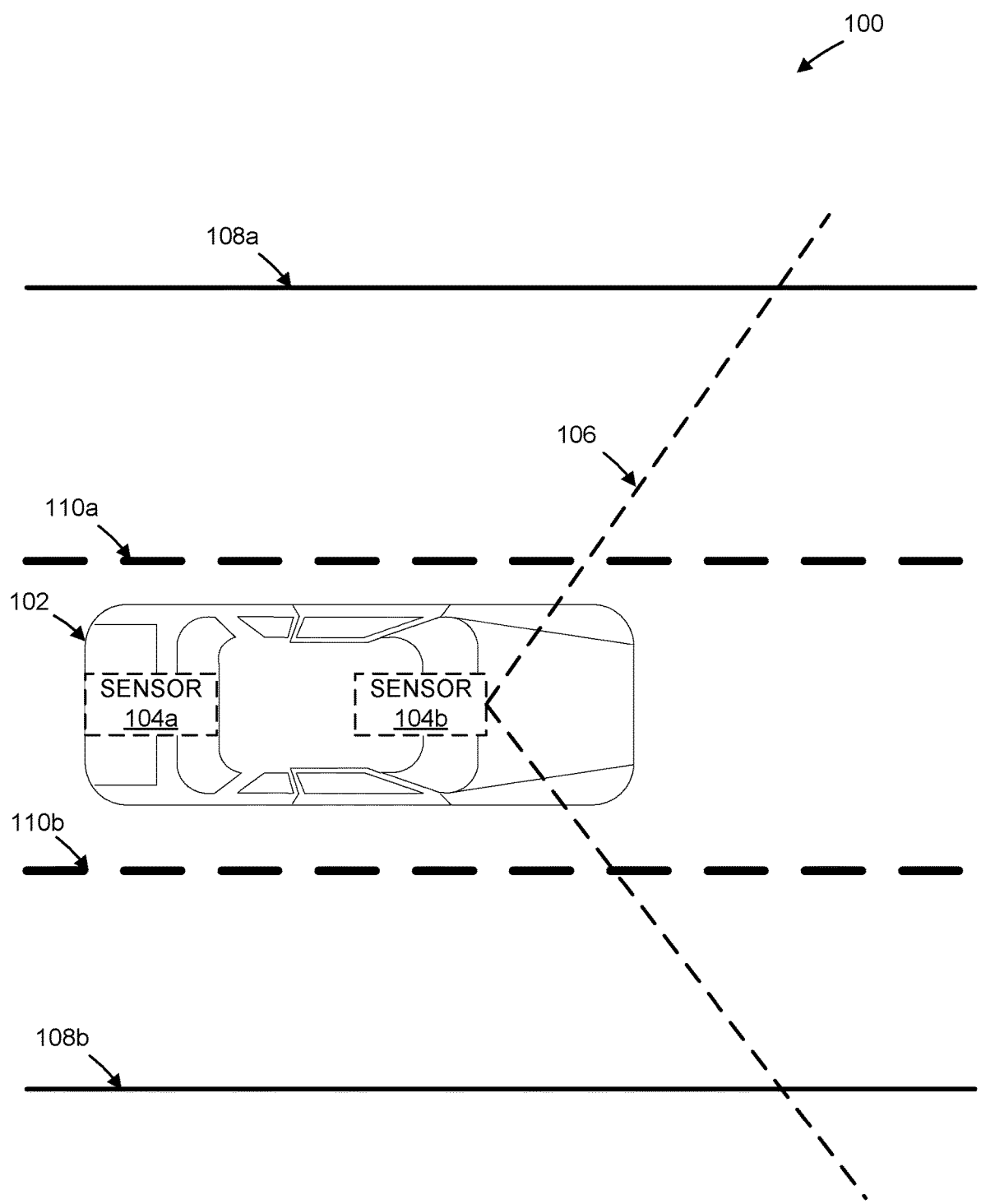
FIG. 1 is an illustration of an example environment upon which the present embodiments may be implemented.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Overview

Historically, the position of vehicles has been established by the Global Positioning System (GPS) through trilateration. However, these measurements may be inaccurate (e.g., with an error of greater than ten meters) and, therefore, are unsuitable for situations where accuracy is paramount. Examples of such situations include autonomous driving, computer-aided driving, and computer-monitored driving. Accordingly, entities have begun developing algorithms designed to estimate the position of a vehicle with much higher accuracy (e.g., with an error of less than 10 centimeters). The process by which these algorithms are implemented/employed is referred to as "localization."

As discussed above, conventional localization processes suffer from several drawbacks. For example, some algorithms require that onerous calibration procedures be performed periodically (e.g., before each driving session). As another example, some algorithms are computationally expensive due to the use of complex computer-implemented models, machine learning (ML) algorithms, computer vision (CV) algorithms, etc.

Introduced here, therefore, are computer programs and associated computer-implemented techniques for localization of a vehicle within a lane. For example, a processor may be configured to acquire a stream of image data generated by a forward-oriented image sensor connected to a host vehicle. The term "host vehicle," as used herein, refers to a vehicle to which an image sensor is connected. In some embodiments the image sensor is secured inside the host vehicle (e.g., to the interior surface of the windshield), while in other embodiments the image sensor is secured outside the host vehicle (e.g., to the top surface of the hood). Examples of image sensors include charge-coupled device (CCD) sensors and active-pixel sensors, such as complementary metal-oxide-semiconductor (CMOS) sensors. If the forward-oriented image sensor includes one or more CCD sensors, then the stream of image data may include a series of images generated over time. These images may be, for example, the frames of a video feed.

Then, the processor can localize the host vehicle within a lane by generating a lane drift metric based on the stream of image data. For example, if the stream of image data includes a series of images generated over time, the processor may generate a separate lane drift metric for each image in the series of images. For each image, the processor may extract multiple bands of pixels, identify one or more markings within the multiple bands of pixels that are representative of the lane, and then define a lane region based on the marking(s). Performance of the driver can be graded/scored based on the series of lane drift metrics associated with the series of images. For example, the processor may score the driver based on how many lane drift metrics fall beneath a threshold. As another example, the processor may score the driver based on the general trajectory of the lane drift metrics (e.g., whether the lane drift metrics are decreasing over time, whether the lane drift metrics oscillate periodically, etc.).

In some embodiments, the processor is located inside the host vehicle. For example, the processor could be located within an onboard vehicle system that is attached to the host vehicle, or the processor could be located within an electronic device (e.g., a mobile phone) associated with the driver. In other embodiments, the processor is located outside the host vehicle. For example, the processor could be located in a computer server in communication with the onboard vehicle system, electronic device, etc.

Embodiments may be described in the context of vehicle localization for the purpose of monitoring an individual in real time. For example, the technologies described herein may be part of an observation system designed to monitor a driver of a vehicle over the course of a driving session to determine whether the driver is exhibiting appropriate (e.g., safe) behavior. Such a determination may be based on the lane drift metric(s) produced for the driver. However, those skilled in the art will recognize that these features are equally applicable to other contexts, such as controlling autonomous vehicles.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

System Overview

The present embodiments relate to efficiently locating a vehicle within a lane based on a derived lane drift metric. An image stream onboard a vehicle may be recorded that represents a stream of images of an environment surrounding the vehicle. The vehicle may be localized within a lane using the stream of images to generate a lane drift metric that is indicative of the vehicle's location within a lane. Based on the lane drift metric, a driver may be scored or an output relating to vehicle control can be provided to correct any shift to the vehicle within the lane.

The present embodiments may provide a determination of whether a vehicle is drifting within a lane (e.g., experiencing lane drift) during a driving session. This may include determining a degree (e.g., severity, frequency, amplitude, etc.) of lane drift (e.g., quantified as a lane drift metric).

The acquired image stream of a region surrounding the vehicle may be transformed into a top-down view of the vehicle. The transformed top-down view of the vehicle can facilitate automatic calibration of a transformation module configured to convert the image stream to the top-down view of the vehicle. Further, driver behavior in relation to lane drift (e.g., driver distraction, driver skill, driver steering performance, driver planning ability, etc.) may be determined using the lane drift metric.

The present embodiments may improve computational functionality of computing systems implementing the features of the present embodiments. For example, the technology can improve upon the processing of collected non-generic data (e.g., by filtering the collected sensor data based on the saliency of the data, enabling the most salient data to be focused upon and processed and the least salient data to be ignored or de-weighted during processing). In another example, the technology can improve computational efficiency through the use of: fewer computational nodes and/or layers (e.g., in a synthetic neural network) by constraining the portion of the image that is analyzed (e.g., constraining the analyzed image to a pair of horizontal pixel bands isolated from the original image); time series information (e.g., of lower per-image resolution than a single-image analysis) in lieu of single-image processing; and, assumed data context based on event triggering (e.g., extracting lane regions based on assumed line straightness due to an event trigger corresponding to highway driving on a substantially straight roadway section).

The present embodiments may improve the functionality of imaging systems implementing the features of the present embodiments. Conventional image processing to extract absolute or relative geometric parameters (e.g., actual distances, relative spacing, etc.) often requires pre-determined calibration data describing intrinsic and extrinsic parameters of the imaging system, such as camera placement within a vehicle, field of view, and lens properties, among others; in contrast, variants of the technology can enable lane localization information (e.g., lane drift metrics, lane position stability, etc.) to be extracted without foreknowledge of intrinsic and/or extrinsic parameters of the imaging system. This can improve the accuracy (e.g., due to a reduction in dimensional calibration error propagation) and resiliency (e.g., against variations of the imaging hardware being used having slightly different intrinsic parameters) of the imaging and image processing technology.

FIG. 1 is an illustration of an example environment 100 upon which the present embodiments may be implemented. As shown in FIG. 1, the environment may include a vehicle 102. Example vehicles can include any motor-operated machine, such as an automobile, truck, bus, scooter, etc.

The vehicle 102 may include sensors (e.g., sensors 104a-b). The sensors can acquire various data relating to the vehicle 102. For example, the sensor 104b can include an image sensor capturing image data surrounding the vehicle 102, represented by imaging range 106.

The environment can include a roadway that includes multiple lanes. For example, the roadway may include outer lane markers 108a-b and lane markers 110a-b. In some embodiments, the roadway can include lanes that allow for vehicle to travel between the markers of a lane. For example, in the embodiment as shown in FIG. 1, the vehicle 102 may travel between markers 110a and 110b. The lane markers may be painted or otherwise highlighted onto the roadway to clearly separate the lanes of the roadway.

The features of the embodiments as discussed herein can be implemented by and/or executed at various related systems. For example, the features of the present embodiments can be performed at least in part by a sensing and computing system onboard a vehicle (e.g., an onboard vehicle system), but can additionally or alternatively be performed at least in part by a remote computing system, such as a server system, a user device (e.g., a smartphone, a tablet, etc.), or by any other suitable set or network of computing systems.

The features of the embodiments may be implemented using data sampled by the onboard vehicle system (e.g., vehicle sensor data), but can additionally or alternatively be performed using auxiliary vehicle data (e.g., signals sampled by the other vehicle sensors besides those of the onboard vehicle system, vehicle data retrieved from a database, intrinsic vehicle data associated with the vehicle itself and stored at the onboard vehicle system, etc.), other vehicles' data (e.g., received from the source vehicle, a database, or any other suitable remote computing system), aggregate population data, historic data (e.g., for the vehicle, driver, geographic location, etc.), or any other suitable data from any other suitable source. The onboard vehicle system can function to capture, record, or otherwise suitably obtain vehicle sensor data corresponding to the vehicle surroundings during a vehicle event (e.g., the event scene, driving scene, etc.) while simultaneously capturing, recording, or otherwise suitably vehicle sensor data corresponding to the driver (e.g., for use in determining the driver behavior) during a vehicle event. However, the onboard vehicle system can otherwise suitably capture correlated interior-exterior data usable to determine the driving policy of the driver.

The onboard vehicle system can include a processing system (e.g., a set of GPUs, CPUs, microprocessors, TPUs, vehicle computing systems, etc.), storage system (e.g., RAM, Flash), communication system, sensor set, power system (e.g., battery, vehicle power connector, photovoltaic system, etc.), CAN bus interface (e.g., wired or wireless), housing, or any other suitable component. The communication system can include telemetry systems (e.g., for vehicle-to-vehicle, vehicle-to-infrastructure, vehicle-to-remote computing system, or other communications), wireless systems (e.g., cellular, Wi-Fi or other 802.11x protocols, Bluetooth, RF, NFC, etc.), wired systems (e.g., Ethernet, vehicle bus connections, etc.), or any other suitable communication systems. The sensors can include: cameras (e.g., wide angle, narrow angle, or having any other suitable field of view; visible range, invisible range, IR, multispectral, hyperspectral, or sensitive along any suitable wavelength; monocular, stereoscopic, or having any suitable number of sensors or cameras; etc.), kinematic sensors (e.g., accelerometers, IMUs, gyroscopes, etc.), optical systems (e.g., ambient light sensors), acoustic systems (e.g., microphones, speakers, etc.), range-finding systems (e.g., radar, sonar, TOF systems, LIDAR systems, etc.), location systems (e.g., GPS, cellular trilateration systems, short-range localization systems, dead-reckoning systems, etc.), temperature sensors, pressure sensors, proximity sensors (e.g., range-finding systems, short-range radios, etc.), or any other suitable set of sensors.

In some embodiments, the onboard vehicle system may include any of a set of interior sensors, a set of external sensors, and a processing system. The internal sensors (e.g., internal-facing camera, microphones, etc.) can be directed toward and monitor the vehicle interior, more preferably the driver volume (e.g., the volume of the interior in which a vehicle driver is and/or would be situated during driving of the vehicle) but alternatively or additionally any suitable interior volume. The external sensors (e.g., exterior-facing camera) are preferably directed outward from the vehicle, and preferably include a region in front of the vehicle (e.g., region preceding the vehicle along the vehicle trajectory, region proximal the driving volume and encompassing the vehicle drivetrain longitudinal vector, etc.), but can alternatively be directed toward the vehicle side(s), top, bottom, rear, or any other suitable region exterior the vehicle and/or including the vehicle surroundings. The sensors may be statically mounted to the vehicle and/or each other (e.g., via the housing), but can be movably mounted by a gimbal, damping system, or other motion mechanism.

The features of the present embodiments can be performed (e.g., executed, implemented, etc.) in real time or near-real time, but all or portions of the features as described herein can alternatively be performed asynchronously or at any other suitable time. The features of the present embodiments may be preferably iteratively performed at a predetermined frequency (e.g., every millisecond, at a sampling frequency, etc.), but can alternatively be performed in response to occurrence of a trigger event (e.g., change in the vehicle attitude, change in user distraction levels, receipt of driving session information, receipt of new sensor information, physical vehicle entry into a geographic region associated with high collision risk, object proximity detection, detection of an onset or end of a driving session, etc.), be performed a single time for a driving session, be performed a single time for the vehicle, or be performed at any other suitable frequency.

The sensors may be configured to record an image stream at an onboard vehicle system arranged within a vehicle. This may allow for obtaining data indicative of the surroundings of a vehicle (e.g., as depicted in the image stream, wherein the image stream is obtained from an exterior-facing camera). This can also function to obtain data indicative of the actions of the driver in relation to the surroundings during a driving-related scenario (e.g., a vehicle event, as depicted in the image stream wherein the image stream is obtained from an interior-facing camera). The image stream may be recorded using an onboard vehicle system as described above; however, image streams can additionally or alternatively be recorded using any suitable sensor system, integrated with and/or distinct from the vehicle itself (e.g., the vehicle, an ego-vehicle, etc.).

Image streams can include synchronous image data (e.g., temporally synchronous, spatially synchronized or correlated, etc.) captured from at least two cameras: a first camera oriented to image outside the vehicle, and a second camera oriented to image within the vehicle. The synchronized sensor data (e.g., from inside and outside cameras) can be used to correlate driver activities (e.g., driver behavior) to events that are happening outside the vehicle (e.g., vehicle events, lane drift, driving scenarios, etc.).

The sensors may be able to sense the driving environment (e.g., what are the objects in the scene surrounding the vehicle, where such objects are located, properties of the objects, etc.). The driving environment can be continuously or discontinuously sensed, recorded, or otherwise suitably determined. This can be performed, in variations, in response to a trigger (e.g., an event-based trigger, a threshold-based trigger, etc.).

The sensors can be capable of collecting supplementary data, which can be visual (e.g., image) data and/or non-visual vehicle sensor data. The vehicle sensor data can additionally or alternatively include location data (e.g., GPS data), motion data (e.g., inertial measurement unit (IMU) data), and any other suitable type of sensor data. Vehicle sensor data that is collectively aggregated from one or more data streams preferably includes two-way video data (e.g., inward facing video camera data and outward facing video camera data), and can also include inertial data, gyroscope data, location data, routing data, kinematic data, and other suitable vehicle telemetry data (e.g., collected from an OBD II port via a suitable data connection). However, vehicle sensor data can include any other suitable data.

Deriving a Lane Drift Metric

Figure 2A:
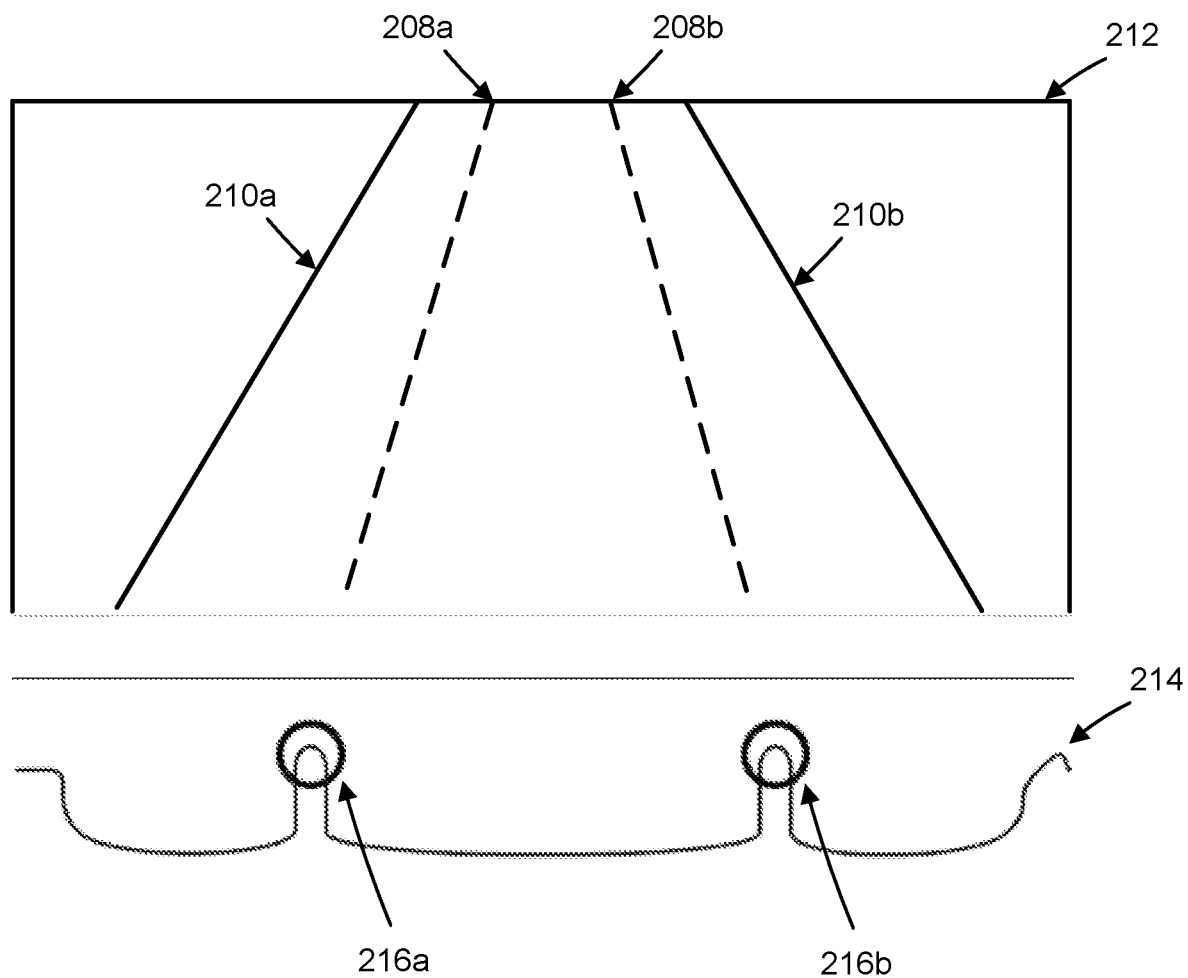
FIG. 2A illustrates an example imaging region and an extracted lane region.

As noted above, a sensor (e.g., imaging device) may capture an image of an environment surrounding a vehicle. Based on captured image, a lane region can be detected. FIG. 2A illustrates an example imaging region 212 and pixel values 214 of a horizontal band of pixels (two pixel values of pixels 216a-b corresponding with lane markings are also shown). In the embodiment as shown in FIG. 2, the imaging region 212 may identify various lane markers of a roadway (e.g., lane markers 208a-b and outer lane markers 210a-b).

The imaging region 212 can be inspected to localize the vehicle within a lane to generate a lane drift metric, which may allow for determining information pertaining to the location of the vehicle within the lane (e.g., as a function of time, at an instant in time, etc.) and quantify the information as a metric of lane drift.

Localizing the vehicle may to determine information indicative of the location change (e.g., time derivative of the location) of the vehicle within the lane (e.g., quantified as a lane drift metric), but can alternatively function, in variations, to determine the relative position of the vehicle within the lane. Localizing the lane region can also including determining a lane region in which the vehicle is traveling during a driving session.

As shown in FIG. 2A, a lane region may be extracted from the forward-oriented image of the image stream 212. For example, the lane region can be an approximate lane region that can be used to determine the time variation of the lane position (e.g., a lane drift metric), wherein the approximate lane region has an accuracy that is greater than a threshold accuracy for determining temporal variation and less than a threshold accuracy for absolute position determination or localization. In some examples, enforcing a lower accuracy threshold can function to decrease the computational power and/or algorithmic complexity needed to determine the lane region and/or to increase the speed at which the lane region is determined.

In some embodiments, determining the lane region can include extracting at least two horizontal pixel bands from the forward-oriented image 212, extracting lane markings from the two horizontal pixel bands, and defining the lane region based on the extracted lane markings. However, a single band (e.g., horizontal band, angled band, etc.) or any suitable number of bands can be extracted from the forward-oriented image.

In some embodiments, two horizontal pixel bands can span the entire width of the forward-oriented image and each span a height that is less than the height of the image such that the two horizontal pixel bands are of equivalent non-overlapping heights. In other embodiments, the two or more horizontal pixel bands can be of any suitable width(s) and/or height(s) and can be overlapping or non-overlapping.

Figure 2B:
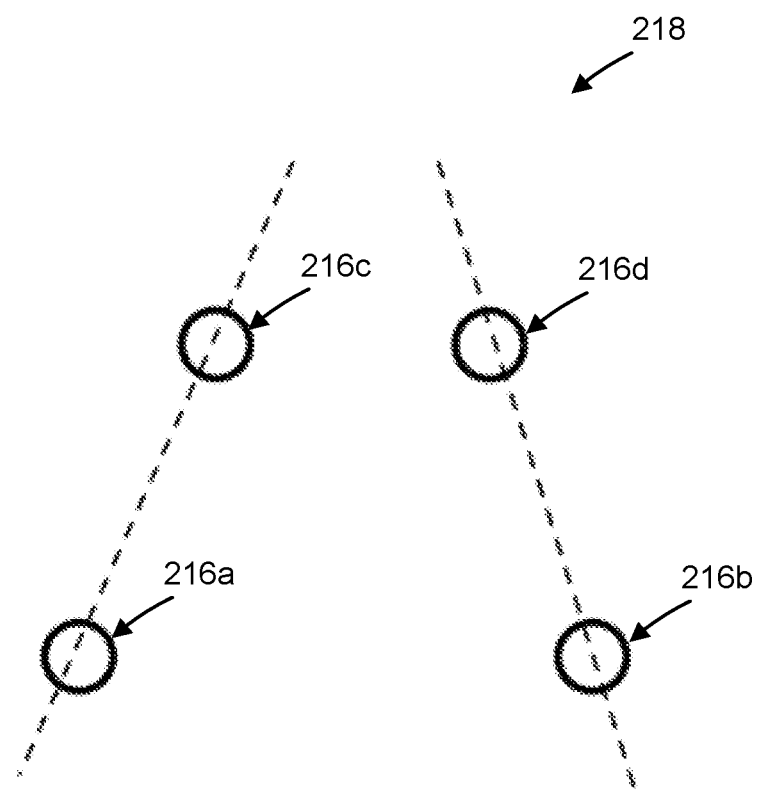
FIG. 2B illustrates an example lane marking extracted from an image.

FIG. 2B illustrates an example lane marking 218 extracted from an image 212. As shown in FIG. 2B, the lane marking 218 can include a series of pixel bands extracted from an image during a time period. For example, one band (including pixels 216a-b corresponding with lane markings) may be derived at a first time period from a first image, and another band (including pixels 216c-d corresponding with lane markings) may be derived at a second time period from a second image. Combining the series of pixel bands may allow for generation of the example lane marking 218.

Extracting lane markings can include extracting horizontal positions (e.g., within the image) of the lane markings based on properties of the lane markings (e.g., known standardized width of the lane line, known standardized width of the lane and thus relative positions of lane markings, local straightness of the lane markings, etc.), which can be predetermined (e.g., based on historical data, regulations associated with the geographic location or region, etc.) and/or dynamically determined (e.g., extracted from a previous frame of the image stream, estimated from features within the same frame of the image stream, etc.).

In an example, extracting the lane markings includes averaging the intensity value of each pixel in each vertical column across the horizontal band, and determining the horizontal centroid of the lane marking in each quadrant of the image based on the dark-to-light and/or light-to-dark transition of the intensity values. As another example, the intensity value of each pixel in an angled column can be averaged, wherein the angled column is angled at an angle determined based on a projected angle of a lane marking that is assumed to be straight along a forward direction relative to the vehicle. In alternative examples and/or variations, extracting the lane markings can omit averaging of pixel intensities (e.g., wherein the horizontal pixel bands are a single pixel in height, wherein multiple non-averaged horizontal intensity traces are considered in determining the horizontal centroids of the lane markings, etc.).

In some embodiments, extracting the lane markings can include providing the horizontal pixel bands as inputs to a trained classification model and obtaining the lane region based on the output of the trained classification model. The classification model can be trained according to any suitable machine learning methodology and/or technique. In a first example, the trained classification model may include an end-to-end model that outputs the lane region (e.g., in the frame of the forward-oriented image) as the output. In a second example, the trained classification model can output the horizontal positions of the lane markings within the horizontal pixel bands, and the lane region is deterministically computed from the four-sided polygon constructed from the four horizontal positions (e.g., two per horizontal pixel band wherein there are two horizontal pixel bands). In some embodiments, the lane markings can be manually extracted, wherein a user elects two points corresponding to the lane markers in each band. However, the lane region can be otherwise suitably determined using a trained classification model.

Figure 3:
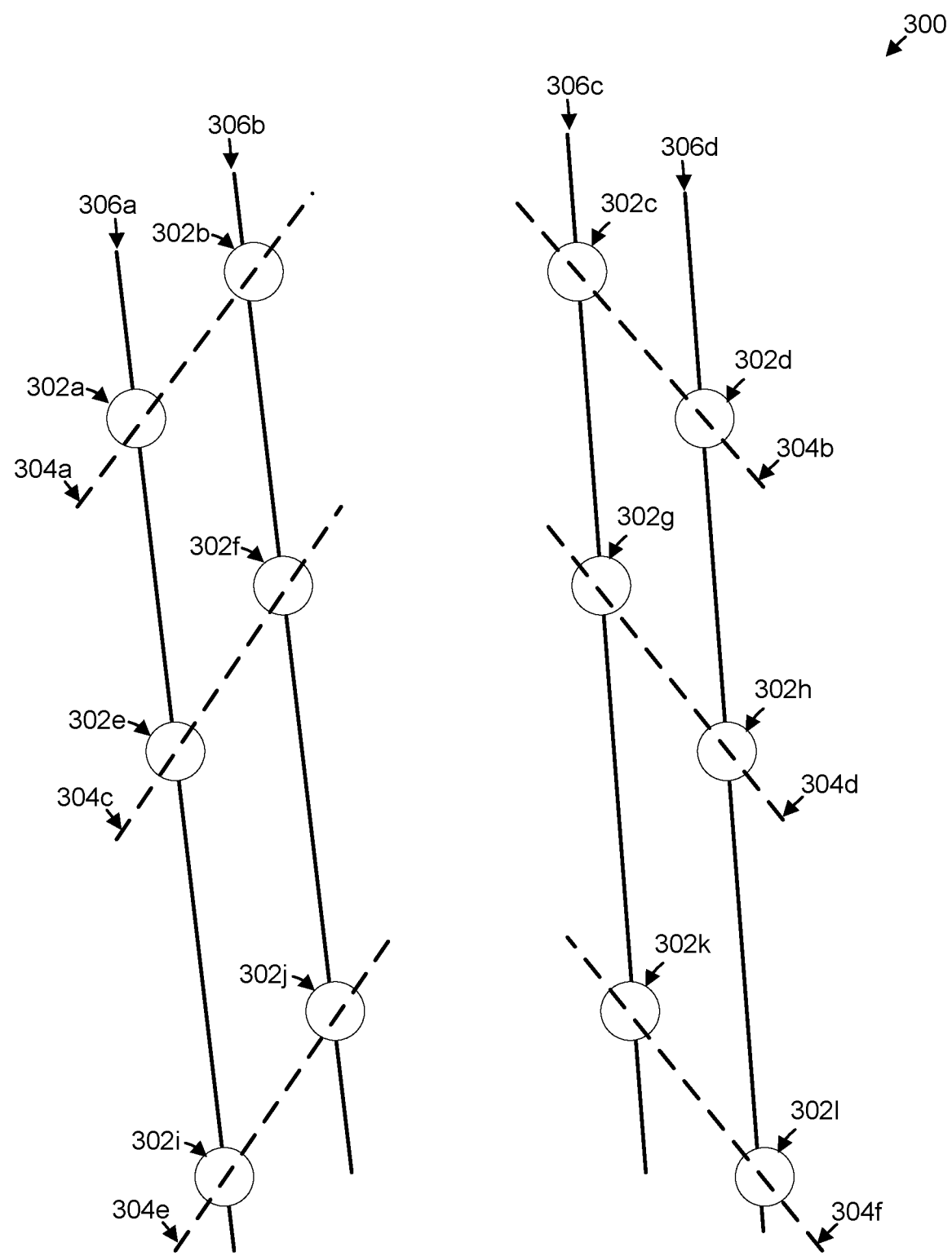
FIG. 3 illustrates an example block diagram of an extracted lane region used to generate a lane drift metric.

FIG. 3 illustrates an example block diagram of an extracted lane region 300 used to generate a lane drift metric. As shown in FIG. 3, the extracted lane region can comprise multiple points defining a lane region 300. In some embodiments, each series of points may indicate pixel bands detected from an image at a time. For example, points 302a-d may include pixel bands detected from a first image captured at a first time, points 302e-h may include pixel bands detected from a second image captured at a second time, and points 302i-l may include pixel bands detected from a third image captured at a third time.

In some embodiments, points included in the extracted lane region may be inspected to derive lines between the points. For example, lines 304a-f may be generated between common pixel bands.

The pixel bands detected from images may be tracked during a time period, which may be represented by tracking lines 306a-d. The tracking lines 306a-d may identify the overall trend of the pixel bands over a time period.

A lane drift metric may be derived from a plurality of images of the image stream based on the lane region. Deriving the lane drift metric may quantify the drift of the vehicle within the lane region (e.g., the lane region extracted from the image stream). Examples of lane drift metrics that can be determined can include: a mean or median deviation (e.g., the lane region points' mean or median amount of lateral change over time), the deviation pattern over time, the deviation magnitude, or any other suitable metric associated with lane drift.

Figure 4:
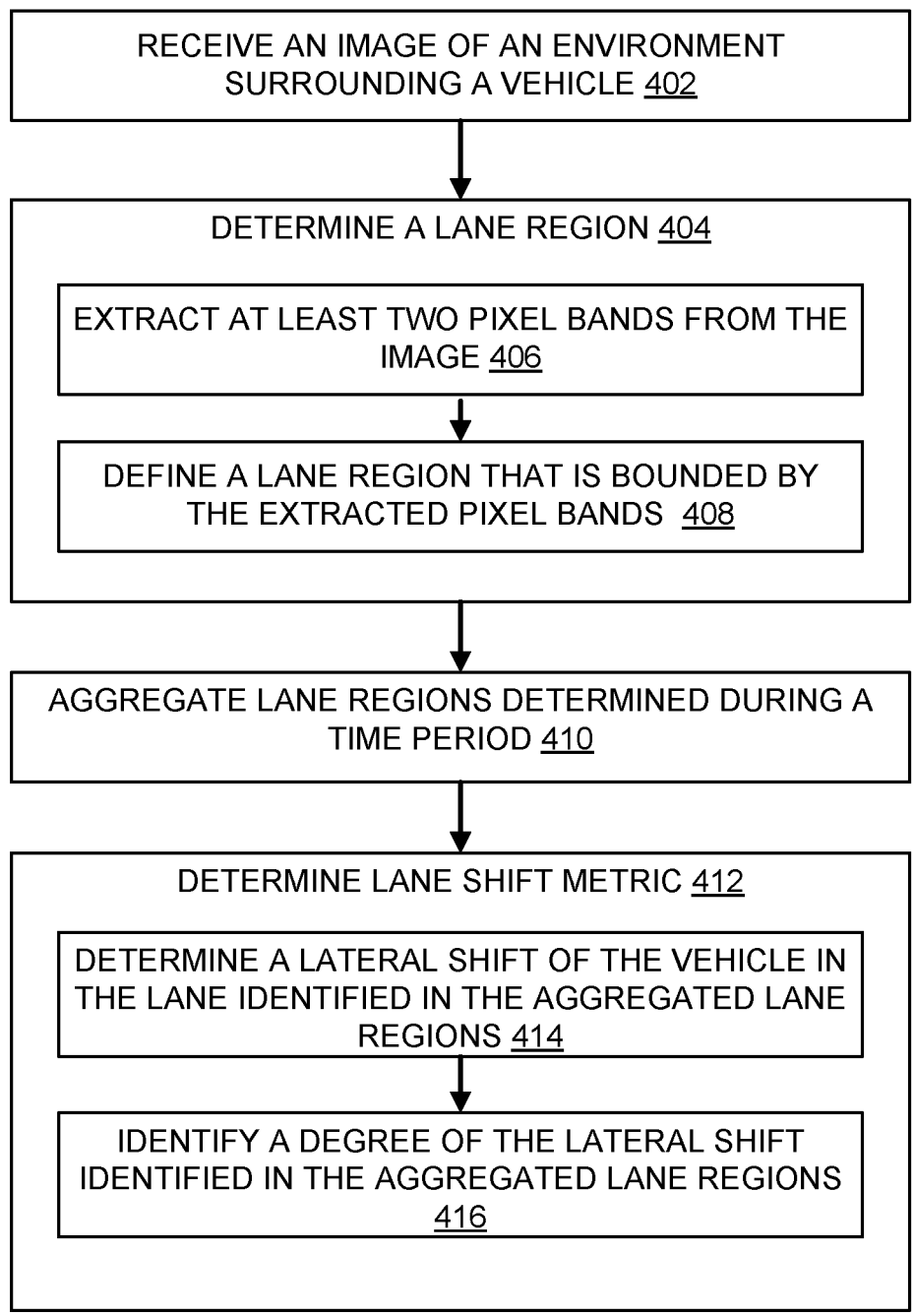
FIG. 4 illustrates a block diagram of an example method for deriving a lane drift metric.

FIG. 4 illustrates a block diagram of an example method 400 for deriving a lane drift metric. The method may include receiving an image of an environment surrounding a vehicle (block 402). The image can be captured by camera(s) disposed on a vehicle.

The method may include determining a lane region (block 404). Determining the lane region may include extracting at least two pixel bands from the image (block 406). Determining the lane region may include defining a lane region that is bounded by the extracted pixel bands (block 408).

The method may include aggregating lane regions determined during a time period (block 410). The aggregated lane regions may depict an extended lane region bounded by a series of extracted pixel bands.

The method may include determining a lane drift metric (block 412). The lane drift metric can quantify the degree to which a vehicle moves within a lane region (e.g., the frequency at which the vehicle departs from a horizontal or lateral center of the lane above a threshold distance, the rate at which the lateral position of the vehicle changes, etc.).

The lane region may be extracted from a forward-oriented image of the image stream as described above in relation to deriving the lane drift metric but can additionally or alternatively be otherwise suitably determined.

In some embodiments, deriving the lane drift metric may include extracting the lane drift metric independently of the absolute location of the vehicle within the lane. In such variations, the lane drift metric may quantify the change in lane position as a function of time (e.g., the time derivative of the lane position) and can be directly computed from the image stream data (e.g., a time series of images) without computing the lane position in each image. In some embodiments, deriving the lane drift metric can include extracting a lane drift metric based on a time series of lane positions extracted from a corresponding series of images from the image stream, and/or otherwise suitably extracting a lane drift metric.

In some embodiments, extracting the lane drift metric can include computing the change in relative position of the extracted horizontal centroids of the lane markings between two or more image frames of the image stream (e.g., a forward-oriented image stream, a synthetic top-down image stream, etc.).

In a first example, the lane drift metric is computed based on the time derivative (e.g., a constant factor of the derivative, a function dependent on the time derivative, etc.) of the lane position, wherein the time derivative is computed by way of a finite differencing operation (e.g., forward differencing, centered differencing, rearward differencing, any other suitable finite differencing scheme, etc.).

In a second example, the lane drift metric is computed based on a lane drift model (e.g., a trained machine learning model), wherein inputs to the lane drift model include context parameters and the lane region, and the lane drift model outputs the lane drift metric based on the inputs. In a specific example, this can include: tracking each lane marking in the respective pixel bands, such as by identifying and tracking the horizontal centroids (e.g., using mean-shift tracking, contour tracking, Kalman filters, particle filters, etc.) through successive frames of the image stream; calculating the spatial change in the relative position of each lane marking within the respective pixel band between one or more successive image frames; and calculating the lane drift metric based on the spatial change of one or more of the lane markings. However, extracting the lane drift metric can additionally or alternatively be otherwise suitably performed.

Determining a lane drift metric may include determining a lateral shift of the vehicle in the lane identified in the aggregated lane regions (block 414). The lateral shift may represent an offset between the vehicle in the lane region. Determining a lane drift metric may include identifying a degree of lateral shift identified in the aggregated lane regions (block 416). The degree of lateral shift may indicate a distance between a center of the vehicle and a center of the lane region.

Implementing a Transformation Matrix

Figure 5:
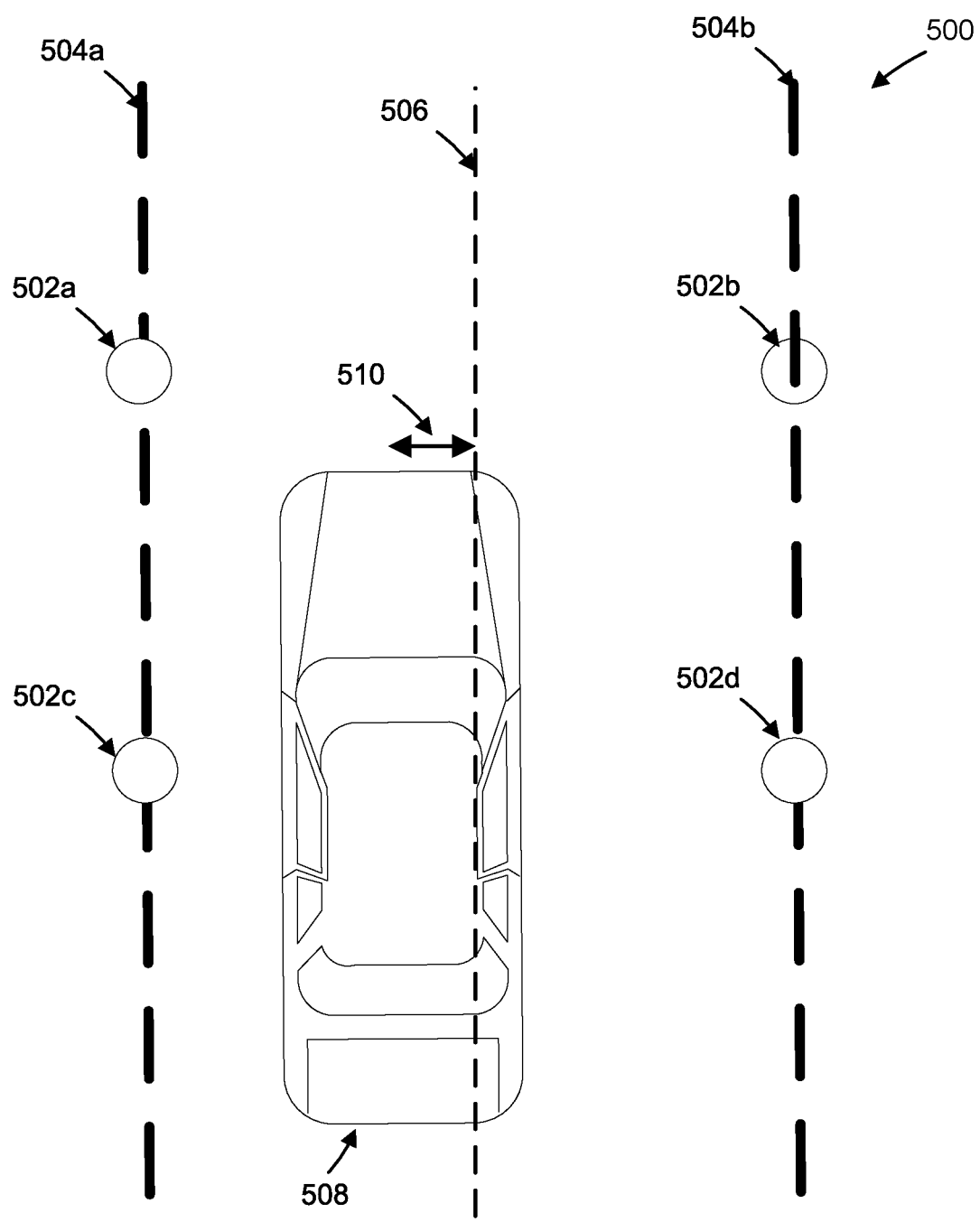
FIG. 5 illustrates a block diagram of an example top-down view of a vehicle relative to a lane region translated from a forward-oriented image according to a transformation matrix.

FIG. 5 illustrates a block diagram 500 of an example top-down view of a vehicle relative to a lane region translated from a forward-oriented image according to a transformation matrix. As shown in FIG. 5, the top-down view (or birds eye view) can provide a top view of a vehicle that represents the lane drift of the vehicle relative to the lane region.

As noted above, the lane region (lanes 504a-b) can comprise a plurality of points 502a-d generated from an image stream. Based on the determined lane region, a center 506 can be derived representing a middle point between the lane region (e.g., between lane 504a and 504b). The position of the vehicle 508 relative to the center 506 in the lane region can represent a degree of lane drift of the vehicle 508. For example, the vehicle would have no lane drift if the vehicle is directly centered on center 506. As another example, as shown in FIG. 5, the vehicle 508 may be off center, indicating that the vehicle is drifting from the center 506 of the lane region.

The top-down view of the vehicle relative to the lane region may be generated based on the forward-oriented image and according to a transformation matrix. The transformation matrix may convert information extracted from the forward-oriented image into a depiction of the vehicle from a top-down (e.g., bird's eye) view. In applications wherein extracted lane localization data is used in conjunction with mapping and/or other geospatial location data, the transformation matrix can also function to enable direct comparison of the localization information to mapping data representing the vehicle surroundings and/or environment from a top-down perspective.

The transformation matrix may also define a top-down frame from which the lane localization information (e.g., lane drift metric) can be extracted (e.g., instead of or in addition to the forward-oriented frame). As noted below, generating the top-down view of the vehicle and lane region may include any of initializing a transformation matrix, computing the transformation matrix corresponding to a frame of the image stream, and transforming the lane region determined from the forward-oriented image into a top-down view of the lane region, according to the transformation matrix.

Generating the transformation matrix and/or the top-down view of the vehicle can be performed at the vehicle (e.g., at a computing module of the onboard vehicle system, at an application executing on a mobile device within the vehicle, etc.), at a remote computing system (e.g., a remote server in communication with the onboard vehicle system, a distributed data storage and retrieval infrastructure, etc.), and/or at any other suitable location. In a specific example, generating the transformation matrix is performed at a remote computing system based on images received from the onboard vehicle system, wherein the transformation matrix is transmitted to the onboard vehicle system, and generating the top-down view of the vehicle are performed at the onboard vehicle system based on the initialized transformation matrix transmitted from the remote computing system to the onboard vehicle system. However, generating the transformation matrix and/or the top-down view of the vehicle can be otherwise suitably distributed between portions of a computing system including a remote computing system and onboard vehicle system (e.g., an onboard vehicle system including an onboard computing system).

Generating the transformation matrix and/or the top-down view of the vehicle can be performed based on one or more assumptions. The assumption(s) can function to enable aspects of the transformation to be precomputed and/or simplified. For example, a transformation matrix may be generated based on the assumption of local flatness of the roadway, substantial straightness of the roadway, vehicle speed (e.g., above a threshold speed associated with a highway, a particular vehicle speed extracted from inertial data, etc.), and any other suitable assumptions, which can enable corrections to be applied to lane markings extracted from the image data (e.g., to enforce parallel lines in the top-down view, to determine longitudinal spacing between lane markings across two or more frames based on speed, etc.). Assumptions can also include that a transformation matrix exists and can be computed from a set of initialized points given a real set of points from the forward-oriented image.

The transformation matrix and/or the top-down view of the vehicle can be generated in response to a trigger, wherein in such variations the trigger functions to enhance the accuracy of assumptions on which the transformation matrix calculation is based. The trigger can be generated based on any suitable sensor data, vehicle event data, and/or contextual (e.g., supplementary, auxiliary) data (e.g., as described above). For example, the transformation matrix can be based upon the assumptions that lane lines in the forward-oriented image are substantially straight and that the vehicle is not moving laterally above a threshold lateral motion value. For example, a transformation matrix may be generated in response to a trigger generated based on the geographic location of the vehicle designating the vehicle as being on a highway and on a received lateral acceleration signal (e.g., from an IMU of the onboard vehicle system) being below a threshold value.

Figure 6:
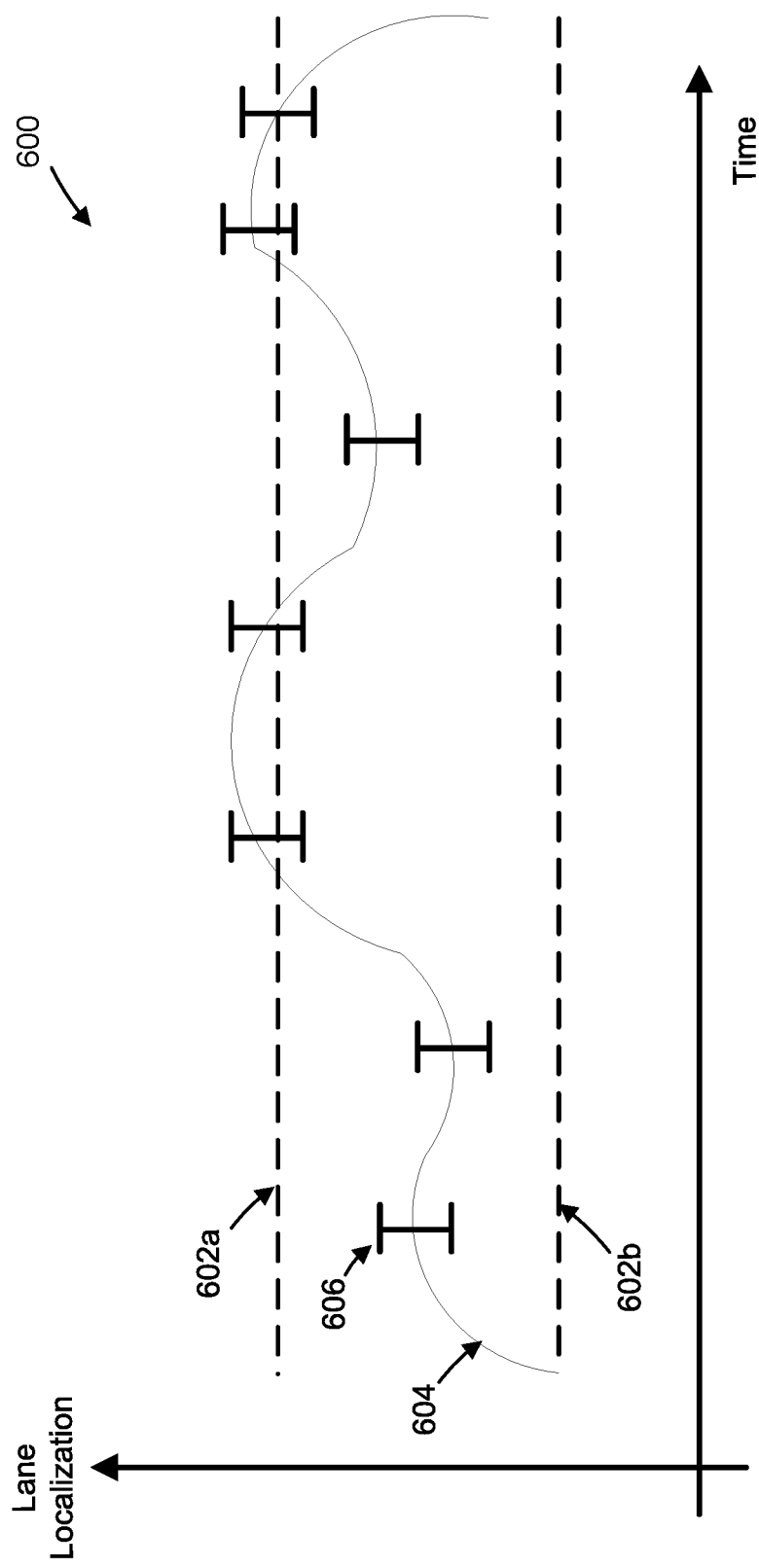
FIG. 6 illustrates an example graphical representation of a determined lane localization of a vehicle.

FIG. 6 illustrates an example graphical representation 600 of a determined lane localization of a vehicle. As shown in FIG. 6, a series of determined lane localization information for a vehicle may be represented in a graphical representation with respect to time. The graph may include lane regions 602a-b disposed on the graph indicative of a derived lane region.

The lane localization may be derived using the steps as described herein. Lane localization of the vehicle may represent the location of the vehicle with respect to the lane region (e.g., the area bounded by lane regions 602a and 602b). The lane localization of the vehicle over a period of time can be represented by trendline 604. The accuracy thresholds of the lane localization can be represented by markers 606.

The graph 600 can represent time when the vehicle crossed outside of the lane region. For example, as shown in FIG. 6, the lane localization trendline 604 can exit the bounds of the lane region 602a-b. As noted below, upon detecting that the vehicle has experienced lane drift, a subsequent action may be performed to correct the lane drift.

Figure 7:
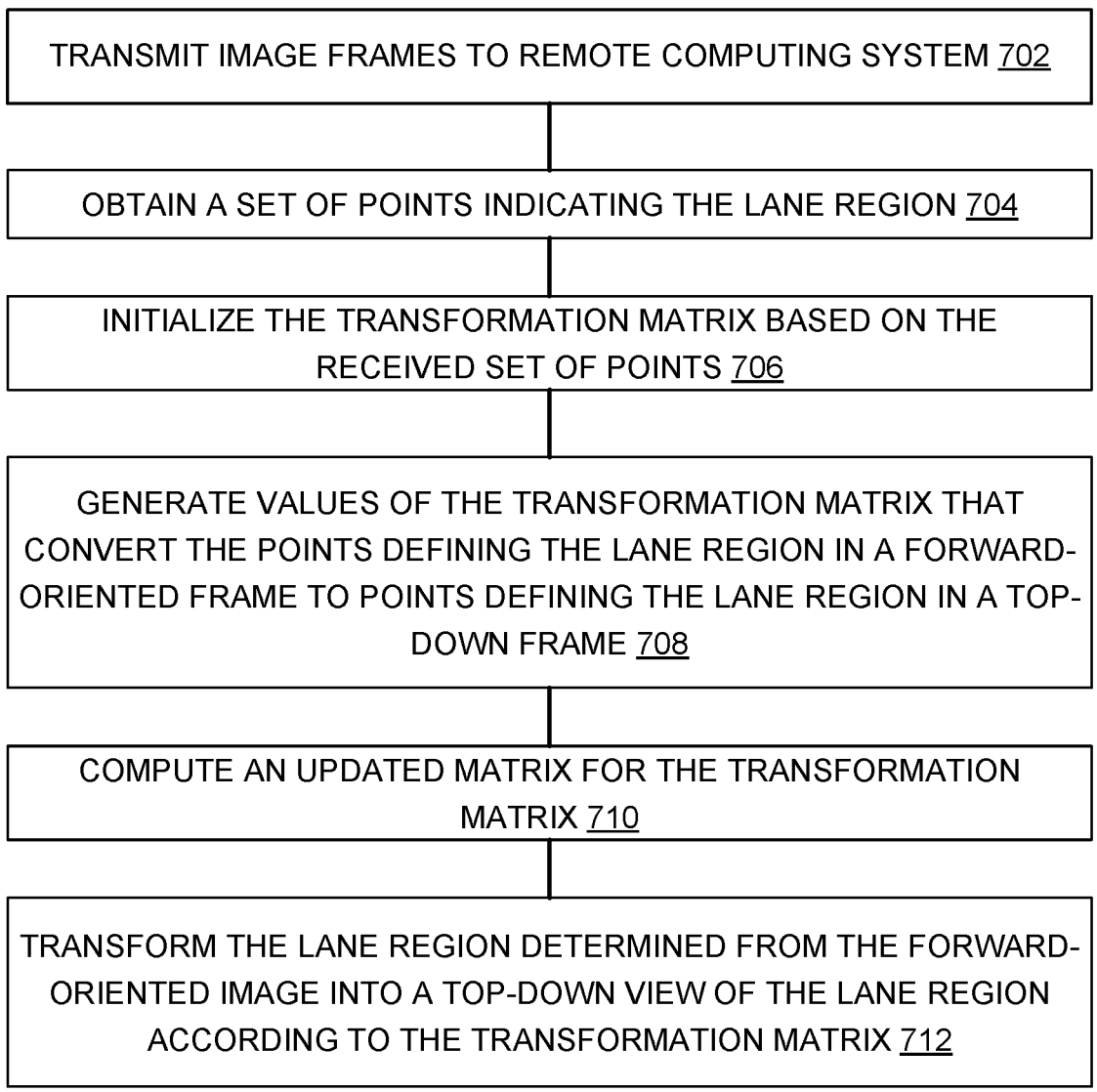
FIG. 7 illustrates a block diagram of a method to implement a transformation matrix.

FIG. 7 illustrates a block diagram of a method 700 to implement a transformation matrix. The method may include transmitting image frames to a remote computing system (block 702). The remote computing system can include a series of interconnected computing device configured to process the image frames received from an onboard computing device via a wireless communication interface.

The method may include obtaining a set of points indicating a lane region (block 704). The set of points may indicate a lane region that can be used to generate a lane drift metric. Based on the lane drift metric, a driver may be scored or an output may be generated relative to the lane drift metric, which is discussed in greater detail below.

The method may include initializing the transformation matrix based on the received set of points (block 706). Initializing the transformation matrix may include determining initial values of the transformation matrix.

In some embodiments, initializing the transformation matrix may include automatically transmitting one or more image frames collected at the vehicle to a remote computing system (e.g., with a user interface) in response to a detected trigger indicating that the vehicle is traversing a highway, suggesting a set of lane marking points to a user, and receiving a set of points from the user that indicate the lane region and initializing the transformation matrix based on the received set of points.

In some embodiments, initializing the transformation matrix can be performed asynchronously (e.g., in non-real time) after recordation and upload of the one or more image frames to a remote computing system, wherein the one or more image frames are associated with metadata (e.g., a label, tag, etc., indicating the vehicle was traversing a highway at the time of image data collection). Initializing the transformation matrix can additionally or alternatively be performed automatically by a computing system, by an autonomous system, etc.

In a specific example, transmitting the image frames to the remote computing device includes uploading a set of image frames (e.g., a video clip) in response to detecting that the vehicle is driving above a threshold speed associated with highway driving (e.g., 45 mph, 55 mph, 65 mph, etc.), receiving a lane region indicator from a user at a user interface in communication with the remote computing system, and initializing the transformation matrix based on the received lane region indicator. In this specific example, this is performed a single time after onboard vehicle system installation and/or adjustment (e.g., after installation). Adjustment of the onboard vehicle system can be detected via inertial signal monitoring (e.g., an orientation sensor detecting a deviation from the installation orientation), image signal monitoring (e.g., comparison of images collected upon vehicle startup and the relative orientation of static objects between scenes in the images), or otherwise suitably determined.

The method may include generating values of the transformation matrix that convert the points defining the lane region in a forward-oriented frame to points defining the lane region in a top-down frame (block 708). Generating a transformation matrix may function to generate the values of the transformation matrix that convert the points defining the lane region in the forward-oriented frame to points defining the lane region in the top-down frame. The transformation matrix can be computed from the lane region points, the known lane width (e.g., for the geographic location associated with the image, for the road type associated with the ego vehicle speed, etc.), from kinematic data of the ego vehicle (e.g., from gyroscope data), or any other suitable data.

The computed transformation matrix may include a matrix T such that TF=V, where F is a matrix defining the vertices of the lane region in the forward-oriented frame and V is a matrix defining the vertices of the lane region in the top-down frame; however, the computed transformation matrix can additionally or alternatively be a matrix $T^{-1}$ such that $F=T^{-1}V$, and/or any other suitable matrix.

The method may include computing an update matrix for the initialized transformation matrix (block 710). For example, a matrix $T_0$ can be initialized for a first lane region associated with a first image frame, and computing the update matrix can include computing a matrix $T_1$ for a second lane region associated with a second image frame subsequent to the first image frame such that $T_1T_0F=V$. However, computing the update matrix can additionally or alternatively include updating the transformation matrix in any other suitable manner.

The method may include transforming the lane region determined from the forward-oriented image into a top-down view of the lane region, according to the transformation matrix (block 712). Transforming the lane region may function to apply the values of the transformation matrix to the points defining the lane region in the forward-oriented frame to compute the points defining the lane region in the top-down frame. Transforming the lane region may be preferably performed by a matrix multiplication operation (e.g., multiplying the matrix defining the points of the forward-oriented image by the transformation matrix in a left-hand matrix multiplication), but can additionally or alternatively be performed by any suitable mathematical transformation. Transforming the lane region can include generating a synthetic view of the vehicle within the lane region from a top-down perspective.

Performance of Subsequent Actions Based on a Lane Drift Metric

As noted above, a lane drift metric may be computed based on the lane position of a vehicle. This can include measuring lane position as a function of time (e.g., as a time series). The precision to which the lane position in a given frame is calculated can be relaxed in some variations, based on a desired precision threshold of the lane drift metric (e.g., the time derivative of the lane position across a plurality of image frames).

A driver may be scored or associated with a value derived from the lane drift metric. The score/value may be indicative of the degree to which the driver is shifted within the lane region during a time period. The may quantify the driving skill of the driver based on the degree to which the driver drifts within his or her lane while driving a vehicle. The score/value may contextualize the lane drift metric and scoring the driver based on the context in which the lane drift metric is determined. The score/value may also function to score other aspects of driver performance besides driver skill (e.g., driver wakefulness, driver distraction, driver navigation efficiency, driver safety and/or risk aversion, etc.).

Scoring based on the lane drift metric can include assigning the lane drift metric value to an associated score on a spectrum of possible scores, wherein a higher score corresponds to a lower lane drift value and a lower score corresponds to a high lane drift value; in alternative variations, the correspondence can be reversed or otherwise suitably mapped. Scoring can additionally or alternatively be based on "binning" of lane drift metrics, wherein a first range of metric values correspond to a first score, a second range of metric values correspond to a second score, and so forth, corresponding to a discrete set of scores (e.g., on a 1-5 scale, on a semantic scale including values of "excellent, good, fair, poor, and unacceptably bad" or any other suitable semantic scale, etc.).

Additionally or alternatively, correlated interior and exterior vehicle events (e.g., as determined substantially as described in the aforementioned incorporated application) can be used as context in determining the lane drift metric. For example, deriving the driver score/value can include determining that the driver is distracted based on sensor signals collected at the onboard vehicle system (e.g., inertial sensor signals, interior-facing imagery, etc.), and scoring the driver based on both the determined driver distraction and the lane drift metric (e.g., wherein the score is lower for a given lane drift metric given the driver is also distracted in addition to exhibiting a high degree of lane drift).

The driver score can be tracked over time (e.g., across multiple driving sessions, within a driving session, etc.) and logging the driver's historical driver score. The historical driver score and associated lane drift metric values can be used as a baseline for determination of the driver score at a future driving session; for example, a driver that exhibits a high baseline lane drift and corresponding driver score can be scored differently than a driver that exhibits a low baseline lane drift, wherein the driver exhibiting a low baseline lane drift can be scored lower (e.g., worse) for the same lane drift metric (e.g., and correspondingly greater relative difference versus the driver having a high baseline lane drift). In some embodiments, the driver score may be based on historical data (e.g., historical driver scores, other historical data such as driving schedule, traffic violation records, and any other suitable data, etc.).

An output related to vehicle control may be generated based on the lane drift metric. Generating the output related to vehicle control may influence vehicle control (e.g., directly influence, indirectly influence, etc.) based on the determined lane drift metric. Generating the output related to vehicle control can also function to generate an output signal that can be directly applied as a vehicle control signal (e.g., a signal to drive a control actuator such as a steering actuator, accelerator, throttle actuator, suspension actuator, etc.), wherein the output signal is based on the lane drift metric. Generating the output related to vehicle control can also function to provide a control-related message to a vehicle driver (e.g., an audible alert, a visual warning, an audio-video signal with control instructions, etc.).

The output related to vehicle control includes generating a vehicle control signal based on the lane drift metric and automatically controlling the vehicle based on the vehicle control signal. For example, the output related to vehicle control includes controlling the steering angle of the steerable wheels of the vehicle in order to maintain the lane drift metric below a threshold value (e.g., to prevent lane departure, to reduce swerving, etc.). Controlling the steering angle can include preventing a steering input exceeding a threshold rate (e.g., "jerking" the wheel), which can be performed in substantially real time, fully real time, and/or with any other suitable temporal characteristics or rate.

In another example, the output related to vehicle control includes governing the speed (e.g., limiting the speed) of the vehicle based on the lane drift metric exceeding a threshold (e.g., to prevent a driver from driving above a speed limit determined based on the degree to which the driver is drifting in his or her lane while driving). In another specific example, generating the output related to vehicle control can include enforcing virtual "bumpers" that are coincident with the determined lane region to prevent lane departure without otherwise interfering with steering inputs (e.g., provided by a human driver). However, generating the output related to vehicle control can additionally or alternatively include generating any suitable vehicle control signal (e.g., braking signal, steering signal, acceleration signal, etc.) based on the lane drift metric and automatically controlling the vehicle based on the vehicle control signal in any other suitable manner.

The output related to vehicle control may include automatically modifying vehicle operation characteristics based on the lane drift metric. Vehicle operation characteristics modified in accordance with this variation of the vehicle control output can include suspension stiffness, brake responsiveness, steering responsiveness, and any other suitable characteristics. For example, the output related to vehicle control can include reducing the steering responsiveness of the vehicle based on the lane drift metric exceeding a threshold value (e.g., to prevent oscillation within the lane due to driver inputs to the steering wheel). In another example, the output related to vehicle control can include increasing the brake responsiveness based on the lane drift metric exceeding a threshold value (e.g., to enable rapid deceleration and stopping due to an estimated, predicted, and/or perceived lack of control of the vehicle by the driver). In further examples, the output related to vehicle control can include implementing advanced driver assistance systems and/or features based on the lane drift metric (e.g., auto-braking, collision avoidance, near-collision reaction, etc.). However, the output related to vehicle control can include otherwise suitably modifying any other suitable vehicle operation characteristics based on the lane drift metric, in any other suitable manner.

The output related to vehicle control may include generating a message related to vehicle control and providing the message to the vehicle driver. The message can include a warning, an alert, an instruction (e.g., a navigation instruction, a control instruction, etc.), a notification, and/or any other suitable type of information related to vehicle control. Providing the message can be performed at an output of the onboard vehicle system (e.g., a speaker for providing an audio warning such as a beep, a light for providing a visual alert such as a flashing light, a display for providing a visual instruction such as a turn arrow, etc.), an output of a mobile device within the vehicle (e.g., associated with the driver, in communication with the onboard vehicle system, etc.), and/or at any other suitable output or user interface. As an example, the output related to vehicle control includes providing an escalating series of auditory warnings as beeps of increasing volume based on the lane drift metric exceeding a corresponding series of threshold values (e.g., to warn the driver that they are drifting too much within their lane). In another example, the output related to vehicle control includes emitting a visual signal (e.g., a light) of various colors depending on the instantaneous lane drift metric (e.g., wherein a green light corresponds to a lane drift metric below a threshold value, a yellow light corresponds to a lane drift metric above the threshold value, and a red light corresponds to an unacceptably high lane drift metric value, etc.). However, the output related to vehicle control can additionally or alternatively include generating any suitable message, in any suitable modality, based on the lane drift metric and providing the message to the driver in any other suitable manner.

Figure 8:
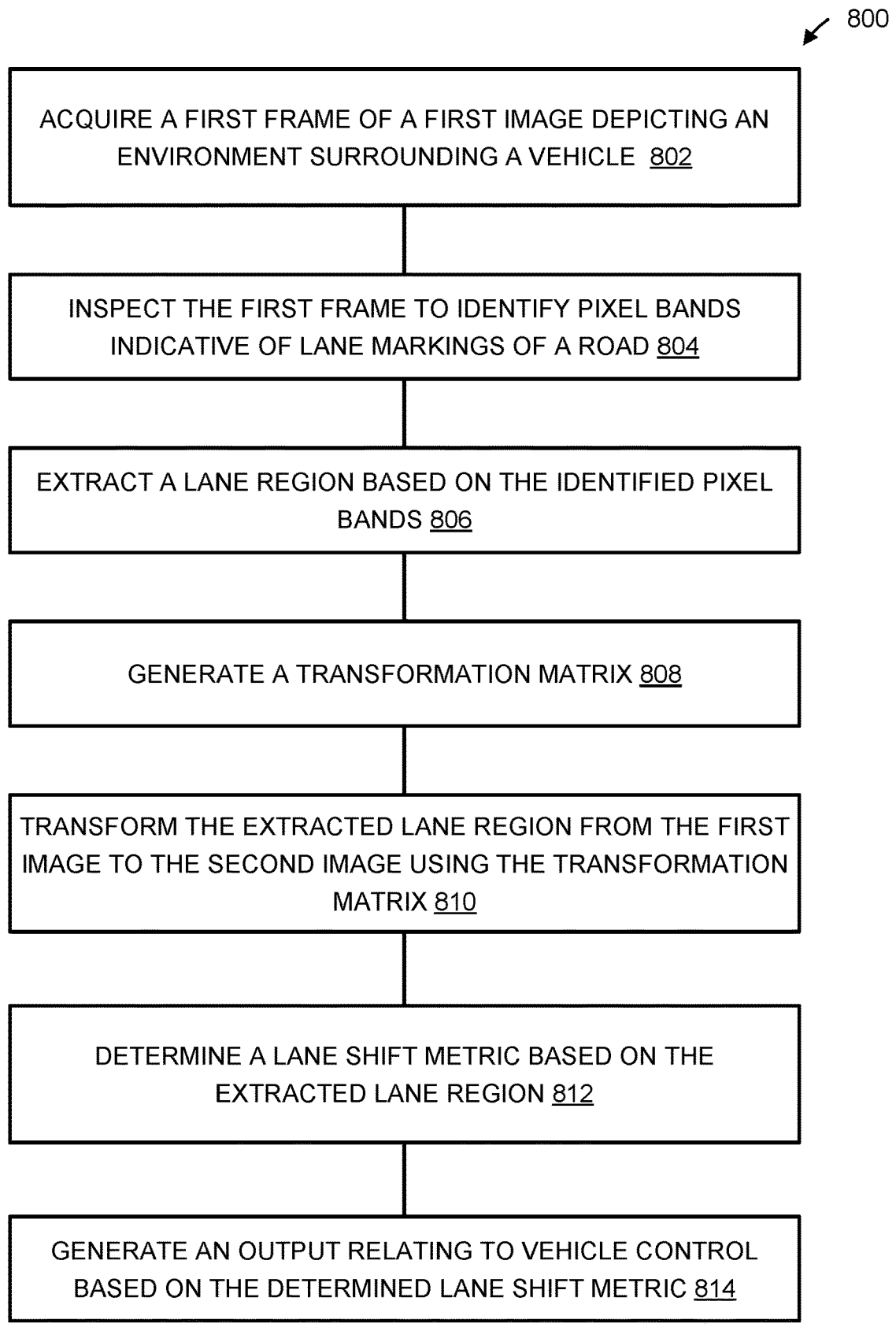
FIG. 8 illustrates a block diagram of an example method to perform an output action to control positioning of the vehicle based on a lane position of the vehicle.

FIG. 8 illustrates a block diagram of an example method 800 to perform an output action to control positioning of the vehicle based on a lane position of the vehicle. The method may be implemented by any of an onboard computing device onboard the vehicle and/or a remote computing device. The onboard computing device may be configured to wirelessly communicate with a remote computing device via a wireless communication interface (e.g., Wi-Fi, cellular network).

The first frame may be acquired responsive to a triggering event. The triggering event may include determining that the vehicle is within a geographic location indicative of the road and determining that an acceleration of the vehicle exceeds a threshold value.

The method may include acquiring a first frame of a first image of an environment surrounding a vehicle captured by an imaging device onboard the vehicle (block 802). The first image may depict a forward-oriented perspective of the environment surrounding the vehicle, such as the image 212 depicted in FIG. 2A.

A stream of images may be acquired that provide multiple images of the environment during a time period (e.g., one minute, ten minutes).

The method may include inspecting the first frame to identify pixel bands indicative of lane markings of a road (block 804). The pixel bands may include pixels 216*a-b* corresponding with lane markings as identified in FIG. 2A, for example. In some embodiments, the method may include aggregating a series of pixel bands identified during a time period, wherein the lane region is extracted based on the series of pixel bands.

The method may include determining multiple trend lines across the multiple sets of pixel bands, wherein each trend line comprises a lane marking, wherein the lane drift metric is indicative of a frequency that the vehicle departs from a center of the lane region during the time period based on the determined lane markings during the time period.

In some embodiments, identifying pixel bands includes detecting pixels in the first image that include a contrasting intensity to other pixels in the first image that exceeds a threshold intensity, wherein each pixel in the pixel bands include pixels with contrasting intensity exceeding the threshold intensity.

In some embodiments, the method may include extracting horizontal positions of the lane markings from the first frame based on a series of predetermined properties of the lane markings, the predetermined properties of the lane marking including any of an indication that the lane markings are substantially straight, an indication that the road is substantially flat, and an indication that the lane markings include a width within a threshold range.

The method may include extracting a lane region based on the identified pixel bands, the lane region bounded by each identified lane marking of the road (block 806). An example lane region may include the region between lane markers 208a-b as described with respect to FIG. 2A.

In some embodiments, the method may include extracting horizontal positions of the lane markings from the first image based on a series of predetermined properties of the lane markings.

In some embodiments, the method may include providing the pixel bands as inputs to a trained classification model configured to identify the lane region, and receiving information relating to the lane region from the trained classification model, wherein said extracting the lane region is based on inspecting the information relating to the lane region received from the trained classification model.

The method may include generating a transformation matrix configured to translate the extracted lane region identified in the first image to a second image providing a second perspective of the vehicle within the lane region (block 808). An example second image depicting a top-down view of the vehicle within the lane region includes block diagram 500 as shown in FIG. 5.

In some embodiments, the method may include performing a matrix multiplication operation to multiply a matrix defining the first frame of the image by the transformation matrix.

The method may include transforming the extracted lane region identified into the first image into the second image using the transformation matrix (block 810). In some embodiments, the method may include utilizing a set of predetermined features of the environment surrounding the vehicle that can be incorporated in generating the transformation matrix.

The method may include determining a lane drift metric based on positioning of the vehicle in relation to the lane region in the second image, the lane drift metric indicative of an offset of the vehicle relative to a center of the lane region (block 812).

The lane drift metric may be indicative of a frequency that the vehicle departs from a center of the lane region during the time period based on the aggregated series of pixel bands identified during the time period.

Determining the lane drift metric may include acquiring a second frame of the first image depicting the environment surrounding the vehicle at a second time, inspecting the second frame to identify pixel bands in the second frame, extracting an updated lane region based on the identified pixel bands in the second frame, and determining a change in a relative position of horizontal centroids included in lane markings between the lane region and the updated lane region, wherein the lane drift metric may be determined based on the determined change.

In some embodiments, the lane drift metric is determined based on a lane drift model, wherein inputs to the lane drift model may include context parameters and the lane region, the lane drift model may be configured to output the lane drift metric based on the inputs.

The method may include generating an output relating to vehicle control based on the determined lane drift metric (block 814). In some embodiments, the method may include performing a vehicle action configured to correct lane position of the vehicle within the lane region in accordance to the generated output relating to vehicle control.

The method may include generating a driver score based on the lane drift metric, the driver score may be indicative of a degree to which a driver of the vehicle shifted the vehicle within the lane region during a time period.

Example Processing System

Figure 9:
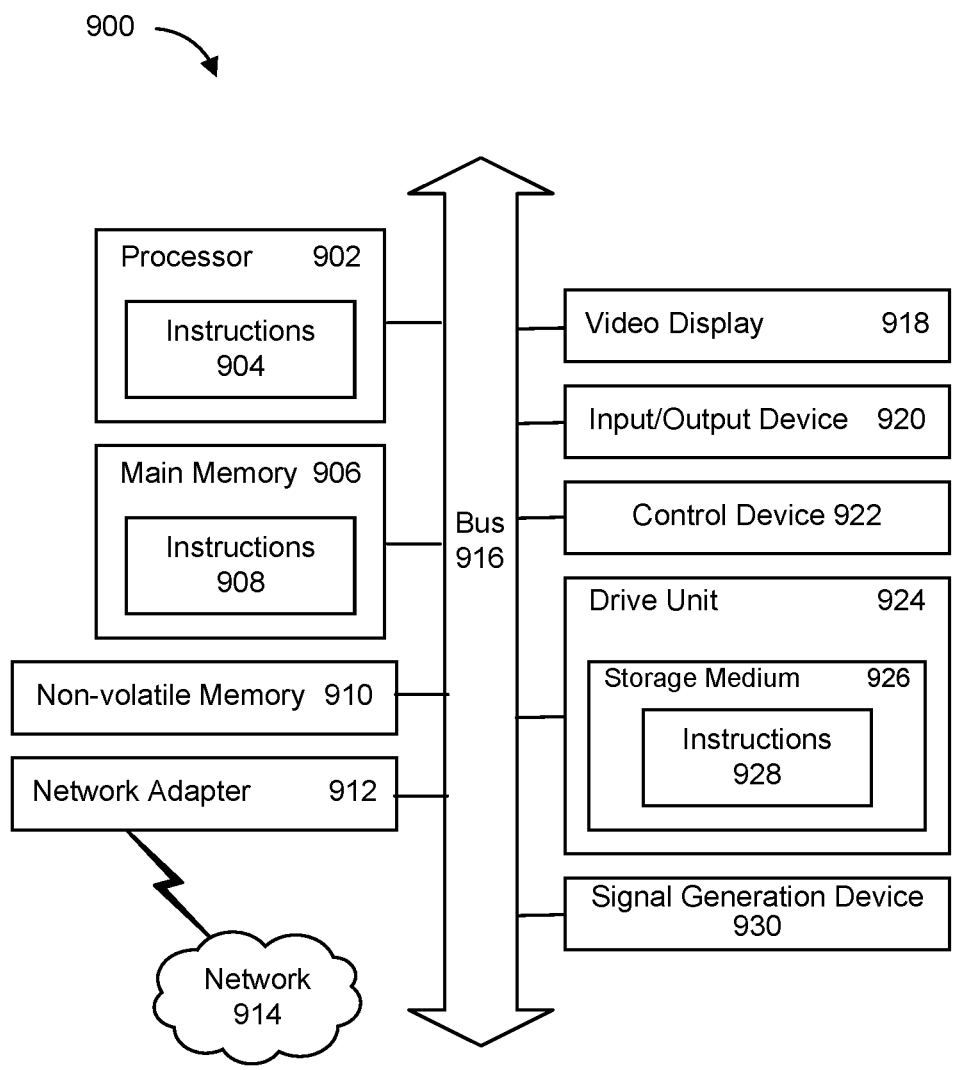
FIG. 9 is a block diagram illustrating an example of a processing system in which at least some operations described herein can be implemented.

FIG. 9 is a block diagram illustrating an example of a processing system 900 in which at least some operations described herein can be implemented. As shown in FIG. 9, the processing system 900 may include one or more central processing units ("processors") 902, main memory 906, non-volatile memory 910, network adapter 912 (e.g., network interfaces), video display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents any one or more separate physical buses, point to point connections, or both connected by appropriate bridges, adapters, or controllers. The bus 916, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 900 operates as part of a user device, although the processing system 900 may also be connected (e.g., wired or wirelessly) to the user device. In a networked deployment, the processing system 900 may operate in the capacity of a server or a client machine in a client-server network environment, or as a peer machine in a peer-to-peer (or distributed) network environment.

The processing system 900 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 900.

While the main memory 906, non-volatile memory 910, and storage medium 926 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 928. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 904, 908, 928) set at various times in various memory and storage devices in a computer, and that, when read and executed by one or more processing units or processors 902, cause the processing system 900 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 910, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 912 enables the processing system 900 to mediate data in a network 914 with an entity that is external to the processing system 900 through any known and/or convenient communications protocol supported by the processing system 900 and the external entity. The network adapter 912 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 912 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method to generate an output responsive to a determined lane shift of a vehicle, the method comprising:
   acquiring a first image of an environment surrounding the vehicle captured by an imaging device onboard the vehicle;
   extracting multiple horizontal bands of pixels from the image, wherein the extracting comprises extracting at least two horizontal bands of pixels;
   identifying at least one marking in each of the at least two horizontal bands of pixels that is associated with a lane in which the vehicle is traveling, wherein one of the at least two horizontal bands has a predetermined length, and is extracted before the at least one marking is identified in the one of the at least two horizontal bands;
   defining a lane region based on the at least one marking identified in each of the at least two horizontal bands of pixels; and
   generating a transformation matrix configured to translate the lane region identified in the first image to a second image providing a second perspective of the vehicle within the lane region;
   transforming the lane region identified into the second image using the transformation matrix;
   determining a lane drift metric based on positioning of the vehicle in relation to the lane region in the second image, the lane drift metric indicative of an offset of the vehicle relative to a center of the lane region; and
   generating an output based on the determined lane drift metric.

2. The method of claim 1, wherein the first image depicts a forward-oriented perspective of the environment surrounding the vehicle, and the second image depicts a top-view perspective of the environment surrounding the vehicle.

3. The method of claim 1, further comprising:
   aggregating a series of pixel bands identified during a time period, wherein the lane region is extracted based on the series of pixel bands.

4. The method of claim 3, wherein the lane drift metric is indicative of a frequency that the vehicle departs from the center of the lane region during the time period based on the aggregated series of pixel bands identified during the time period.

5. The method of claim 1, wherein said defining the lane region further comprises:
   extracting horizontal positions of the lane markings from the first image based on a series of predetermined properties of the lane markings.

6. The method of claim 1, wherein the extracting further comprises:

detecting pixels in the first image that include a contrasting intensity to other pixels in the first image that exceeds a threshold intensity.

7. The method of claim 1, further comprising:
providing the at least two horizontal bands as inputs to a trained classification model configured to identify the lane region; and
receiving information relating to the lane region from the trained classification model.

8. The method of claim 1, wherein said determining the lane drift metric includes:
acquiring a second image depicting the environment surrounding the vehicle at a second time;
inspecting the second image to identify pixel bands in the second image;
determining an updated lane region based on the identified pixel bands in the second image; and
determining a change in a relative position of horizontal centroids included in lane markings between the lane region and the updated lane region, wherein the lane drift metric is determined based on the determined change.

9. The method of claim 1, wherein the lane drift metric is determined based on a lane drift model, wherein inputs to the lane drift model include context parameters and the lane region, the lane drift model configured to output the lane drift metric based on the inputs.

10. The method of claim 1, wherein the vehicle includes an onboard computing device configured to wirelessly communicate with a remote computing device via a wireless communication interface.

11. The method of claim 1, wherein the defining the lane region comprises determining a rectilinear line connecting the at least one marking in one of the at least two horizontal bands of pixels, and the at least one marking in the another one of the at least two horizontal bands of pixels.

12. The method of claim 1, further comprising:
performing a vehicle action configured to correct lane position of the vehicle within the lane region in accordance to the generated output.

13. A computer-implemented method performed by a computing device onboard a vehicle, the computer-implemented method comprising:
acquiring an image of an environment located in front of the vehicle that is generated by a camera connected to the vehicle;
extracting multiple horizontal bands of pixels from the image, wherein the extracting comprises extracting at least two horizontal bands of pixels;
identifying at least one marking in each of the at least two horizontal bands of pixels that is associated with a lane in which the vehicle is traveling, wherein one of the at least two horizontal bands has a predetermined length, and is extracted before the at least one marking is identified in the one of the at least two horizontal bands;
defining a lane region based on the at least one marking identified in each of the at least two horizontal bands of pixels; and deriving a lane drift metric indicative of an offset of a position of the vehicle relative to a center of the lane region; and
providing an output based on the lane drift metric.

14. The computer-implemented method of claim 13, further comprising:
generating a transformation matrix configured to translate the lane region identified in the image to a subsequent image providing a top-down perspective of the vehicle within the lane region;
transforming the lane region into the subsequent image using the transformation matrix.

15. The computer-implemented method of claim 13, further comprising:
aggregating multiple sets of pixel bands in respective images during a time period, one of the images being the first image, and one of the sets of pixel bands comprising the at least two horizontal bands of pixels from the first image;
determining multiple trend lines across the multiple sets of pixel bands, wherein each of the trend lines comprises a lane marking, wherein the lane drift metric is indicative of a frequency that the vehicle departs from the center of the lane region during the time period.

16. The computer-implemented method of claim 13, wherein the defining the lane region comprises determining a rectilinear line connecting the at least one marking in one of the at least two horizontal bands of pixels, and the at least one marking in the another one of the at least two horizontal bands of pixels.

17. A method comprising:
acquiring, by a processor, an image of an environment located in front of a vehicle that is generated by a camera connected to the vehicle;
extracting, by the processor, multiple horizontal bands of pixels from the image, wherein the extracting comprises extracting at least two horizontal bands of pixels;
identifying, by the processor, at least one marking in each of the at least two horizontal bands of pixels that is associated with a lane in which the vehicle is traveling, wherein one of the at least two horizontal bands has a predetermined length, and is extracted before the at least one marking is identified in the one of the at least two horizontal bands;
defining, by the processor, a lane region based on the at least one marking identified in each of the at least two horizontal bands of pixels; and
generating, by the processor, a drift metric based on the lane region.

18. The method of claim 17, wherein each of the at least two horizontal bands of pixels spans an entire width of the image.

19. The method of claim 17, wherein each of the at least two horizontal bands of pixels spans a height that is less than a height of the image such that the at least two horizontal bands of pixels are of equivalent non-overlapping heights.

20. The method of claim 17, further comprising:
producing, by the processor, an output based on the drift metric.

21. The method of claim 17, further comprising:
determining, by the processor, a rectilinear line connecting the at least one marking in one of the at least two horizontal bands of pixels, and the at least one marking in the another one of the at least two horizontal bands of pixels.

22. The method of claim 17, wherein the processor and the camera reside within an onboard vehicle system connected to the vehicle.

23. A method comprising:
acquiring, by a processor, a plurality of images generated by a forward-oriented camera that is connected to a vehicle, wherein the plurality of images comprises two or more images;
extracting, by the processor, a band of pixels from each image in the plurality of images;
identifying, by the processor, a marking in the band of pixels of each of the images that is associated with a lane in which the vehicle is traveling, wherein the band of pixels in each of the images has a predetermined length, and is extracted before the marking is identified in the band of pixels; and producing, by the processor, drift metrics respectively for the images by generating a separate drift metric for each of the images based on the marking identified in each of the images.

24. The method of claim 23, further comprising:
scoring, by the processor, a driver of the vehicle based on a trajectory, a value, or a pattern of the drift metrics.

25. The method of claim 23, wherein each band of pixels is a horizontal band of pixels that spans an entire width of each image.

26. The method of claim 23, wherein the band of pixels in one of the images comprises a first horizontal band of pixels located in a top half of the one of the images, and wherein the method further comprises extracting a second horizontal band of pixels located in a bottom half of the one of the images.

27. The method of claim 23, wherein said identifying comprises:
averaging intensity values of pixels in a column; and
establishing a horizontal centroid of the marking based on dark-to-light transition or light-to-dark transition of the averaged intensity values.

28. The method of claim 23, wherein said identifying comprises:
establishing a horizontal centroid of the marking based on a predetermined width associated with the marking that is based on a known regulation corresponding to a geographical location in which the vehicle is located.

29. The method of claim 23, wherein a horizontal centroid of the marking is dynamically determined.

30. The method of claim 23, wherein said identifying comprises:
averaging intensity values of pixels in an angled column; and
establishing a horizontal centroid of the marking based on dark-to-light transition or light-to-dark transition of the averaged intensity values.

31. The method of claim 30, wherein the angled column is oriented at an angle determined based on a projected angle of a given marking that is assumed to be straight along a forward direction relative to the vehicle.

32. The method of claim 23, wherein said identifying comprises:
providing the bands of pixels of the respective images to a classification model as input;
wherein the drift metrics are generated based on outputs produced by the classification model based on the bands of pixels.

33. The method of claim 32, wherein said providing is performed in real time.

34. The method of claim 23, wherein the drift metrics are representative of discrete calculations of mean deviation, median deviation, deviation pattern over an interval of time, or deviation magnitude.

35. A non-transitory computer-readable medium with instructions stored thereon that, when executed by a processor, cause the processor to perform operations comprising:
acquiring a forward-oriented image that is generated by a camera connected to a vehicle;
extracting a band of pixels from the forward-oriented image;
identifying at least one marking in the band of pixels that is associated with a lane in which the vehicle is traveling, wherein the band of pixels has a predetermined length, and is extracted before the at least one marking is identified in the band;
defining a lane region based on the at least one marking identified in the band of pixels; and
producing a reference matrix that defines vertices of the lane region in the forward-oriented image.

36. The non-transitory computer-readable medium of claim 35, wherein the operations further comprise:
transforming the forward-oriented image into a top-down view.

37. The non-transitory computer-readable medium of claim 35, further comprising extracting another band of pixels from the forward-oriented image, wherein the extracting's are performed to extract the bands that are separated from each other, so that at least a row of pixels between the bands of pixels is excluded from being extracted.

38. The non-transitory computer-readable medium of claim 36, wherein the reference matrix is based on the vertices of the lane region, a width of the lane, kinematic data of the vehicle, or any combination thereof.

* * * * *